United States Patent
Kim et al.

(10) Patent No.: US 8,525,867 B2
(45) Date of Patent: Sep. 3, 2013

(54) CHATTING SERVICE METHOD INTERWORKING VIDEO PHONE SERVICE

(75) Inventors: Nam Gun Kim, Seoul (KR); Goon Don Choi, Seongnam-si (KR); Chang Moon Han, Seoul (KR)

(73) Assignee: SK Planet Co., Ltd., Seoul (KR)

( * ) Notice: Subject to any disclaimer, the term of this patent is extended or adjusted under 35 U.S.C. 154(b) by 823 days.

(21) Appl. No.: 12/676,487

(22) PCT Filed: Sep. 4, 2007

(86) PCT No.: PCT/KR2007/004259
§ 371 (c)(1),
(2), (4) Date: Mar. 4, 2010

(87) PCT Pub. No.: WO2009/031720
PCT Pub. Date: Mar. 12, 2009

(65) Prior Publication Data
US 2010/0208030 A1    Aug. 19, 2010

(51) Int. Cl.
*G06F 15/16* (2006.01)
*H04L 29/06* (2006.01)
*H04N 7/14* (2006.01)

(52) U.S. Cl.
USPC ........... 348/14.02; 348/14.01; 348/14.09; 348/14.1; 361/679.23; 370/260; 370/261; 370/395.2; 455/519; 455/550.1; 709/204

(58) Field of Classification Search
USPC .. 348/14.01, 14.02, 14.09, 14.1; 361/679.23; 370/260, 261, 395.2; 455/550.1, 519; 709/204
See application file for complete search history.

(56) References Cited

U.S. PATENT DOCUMENTS

| | | | | |
|---|---|---|---|---|
| 5,491,797 A | * | 2/1996 | Thompson et al. | 709/204 |
| 5,541,639 A | * | 7/1996 | Takatsuki et al. | 348/14.1 |
| 5,680,392 A | * | 10/1997 | Semaan | 370/261 |
| 6,195,117 B1 | * | 2/2001 | Miyazaki | 348/14.09 |
| 6,466,252 B1 | * | 10/2002 | Miyazaki | 370/260 |
| 6,677,976 B2 | | 1/2004 | Parker et al. | |
| 7,213,050 B1 | * | 5/2007 | Shaffer et al. | 709/204 |
| 7,379,087 B2 | * | 5/2008 | Yamatari et al. | 348/14.09 |
| 7,446,795 B2 | * | 11/2008 | Rengaraju et al. | 348/14.01 |

(Continued)

FOREIGN PATENT DOCUMENTS

| KR | 1020040022738 | 3/2004 |
|---|---|---|
| KR | 1020040031975 | 4/2004 |

(Continued)

OTHER PUBLICATIONS

International Search Report for PCT application No. PCT/KR2007/004259.

*Primary Examiner* — Gerald Gauthier
(74) *Attorney, Agent, or Firm* — Lowe Hauptman & Ham, LLP

(57) ABSTRACT

The present invention implements a chatting the chatting service interworking with a video phone service which can transmit and receive a text during a video phone conversation without terminating the video phone conversation, and furthermore, it improves service quality of a video phone by transmitting and receiving a text during a video phone conversation if a video phone conversation is made in poor an unsuitable environment.

15 Claims, 2 Drawing Sheets

(56) References Cited

U.S. PATENT DOCUMENTS

| | | | |
|---|---|---|---|
| 7,593,744 B2* | 9/2009 | Majahan | 455/519 |
| 8,125,507 B2* | 2/2012 | Ryu et al. | 348/14.02 |
| 8,169,462 B2* | 5/2012 | Ryu | 348/14.02 |
| 2005/0208962 A1* | 9/2005 | Kim | 455/550.1 |
| 2007/0058637 A1* | 3/2007 | Lo | 370/395.2 |
| 2007/0070182 A1 | 3/2007 | Ryu et al. | |
| 2007/0273749 A1* | 11/2007 | Fujii et al. | 348/14.01 |
| 2008/0043418 A1* | 2/2008 | Seo | 361/683 |
| 2010/0208030 A1* | 8/2010 | Kim et al. | 348/14.02 |

FOREIGN PATENT DOCUMENTS

| | | |
|---|---|---|
| KR | 1020060019375 | 3/2006 |
| KR | 1020070034421 | 3/2007 |
| KR | 100758491 | 9/2007 |

* cited by examiner

CHATTING SERVICE METHOD INTERWORKING VIDEO PHONE SERVICE

CROSS REFERENCE TO RELATED APPLICATION

This application is the National Phase application of International Application No. PCT/KR2007/004259, filed Sep. 4, 2007, which designates the United States and was published in English. It is hereby incorporated by reference in their entirety into the present application.

TECHNICAL FIELD

The present invention relates to a chatting service method, and particularly to a chatting service method interworking with video phone service.

BACKGROUND ART

Video phone service means conversing by a phone while viewing a screen provided by a counterpart user through a mobile communication terminal with a camera. As CDMA 1× EV-DO, a WCDMA mobile communication network capable of receiving and transmitting high speed packet data has been commercialized, such video phone service can be provided to a mobile communication service subscriber.

Video phone service is being made based on 3G-324M or CDMA H.323, SIP protocols of WCDMA, and it has an advantage of being able to transferring video and audio together for a phone conversation in contrast to a conventional audio phone conversation, whereas it has a disadvantage of requiring an earphone or a highly efficient speakerphone. Accordingly, if an earphone or a speakerphone is not appropriately prepared, there is a problem that audio cannot accurately be transferred due to noise of in the environment.

To resolve the above problem, if a video phone conversation is unavailable not possible due to noise of in the environment during video phone service, a function capable of transferring a text message to supplement audio message is necessary.

Although there has already been a function to receive a text message during a video phone conversation using an audio/data concurrent service of a mobile telecommunication network, this function is merely to report the fact that a text message is has been received. Accordingly, there is a problem that a video phone conversation should has to be terminated for a mobile telecommunication terminal user to communicate by text message with a counterpart user during a video phone conversation, and there has been not yet prepared a method does not yet exist to transmit and receive a text during a video phone conversation.

DISCLOSURE OF INVENTION

Technical Problem

The present invention is provided to overcome the foregoing stated problem which the prior art contains. It is the object of the present invention to provide a chatting service method interworking with video phone service, capable of transmitting and receiving a text during a video phone conversation without terminating a the video phone conversation.

It is another object of the present invention to improve a the service quality by transmitting and receiving a text during a video phone conversation so as to supplement a video phone call when a video phone conversation is made in poor an unsuitable environment.

Technical Solution

In order to achieve the object of the present invention from the first viewpoint, a chatting service method interworking with a video phone service in a mobile communication system capable of using a video phone service is provided, the method comprisinges steps of: (a) initiating a video phone call between mobile communication terminals, and the mobile communication system transmitting chatting service subscription confirmation messages to the mobile communication terminals participating in the video phone call; (b) if a chatting service request signal is input to at least one of the mobile communication terminals in a video phone call, confirming whether the mobile communication terminal is available for the chatting service interworking with a video phone service, and if the chatting service is available, the mobile communication terminal transmitting the chatting service request message through a mobile switching center (MSC) to a counterpart mobile communication terminal, confirming whether the counterpart mobile communication terminal is available for the chatting service, and transmitting the confirmation result to the mobile communication terminal having transmitted the chatting service request message; and (c) if the counterpart mobile communication terminal is available for the chatting service, transmitting a chatting service response message to the mobile communication terminal having transmitted the chatting service request message to initiate the chatting service interworking with a video phone service.

Preferably, the method may further comprise a step of registering the chatting service interworking with a video phone service for the mobile communication terminal as an additional service, prior to step a).

Preferably, the step of registering the additional service may comprise the steps of: as the mobile communication terminal requests the MSC to register the chatting service interworking with a video phone service, the MSC transmitting numerals of the mobile communication terminal and information on the additional service to be changed to a home location register (HLR) to request for registration of the additional service; the HLR changing the information on the additional service of a subscriber corresponding to the numerals of the mobile communication terminal; the HLR transmitting the change result of the additional service information to the MSC; and the MSC transmitting the registration result of the additional service to the mobile communication terminal.

Preferably, the step of registering the additional service may further comprise: the HLR receiving the additional service subscription information to perform the change, wherein the additional service subscription information is formed by the mutual communication between the subscriber of the mobile communication terminal and a customer center of a mobile communication provider.

Preferably, the chatting service request message in step (b) may be transmitted as being included in an H.245 User Input Indication message.

Preferably, the chatting service request message may comprise an object field and a data field, or it may further comprise an additional field.

Preferably, the object field may comprise information on types of messages, and the data field may record data which are is actually transmitted.

Preferably, the step of confirming whether the counterpart mobile communication terminal is available for the chatting service may comprise steps of: the counterpart mobile communication terminal confirming the chatting service subscription confirmation message received from the mobile communication system in step (b), and transmitting the chatting service request message corresponding to this chatting service subscription confirmation message.

Preferably, the chatting service response message may be transmitted as being included in an H.245 User Input Indication message.

Preferably, the chatting service response message may comprise an object field and a data field, or it may further comprise an additional field.

Preferably, the object field comprises information on types of messages, and the data field may record data which are is actually transmitted.

Preferably, after the chatting service is initiated in step (c), chatting contents may be transmitted and received through an H.245 User Input Indication message between the mobile communication terminals.

Preferably, the User Input Indication message, through which the chatting contents are transmitted and received, may comprise an object field and a data field.

Preferably, the data field may comprise a data coding scheme (DCS) field defining a data coding scheme, a user data length (UDL) field defining a the size of transmitted data, and a user data (UD) field recording the chatting contents.

Preferably, the data coding scheme may be one of Korean standard code (KSC) 5601 code, an American standard code for information interchange-8 (ACSII8) code, an American standard code for information interchange-7 (ACSII7) code, a global system for mobile communications-7 (GSM7) code, and a universal character set 2 (USC2) code.

Advantageous Effects

According to the present invention, a chatting service can be made provided in association with a video phone service so that a conversation on the phone can easily progress although it is difficult to make a video phone conversation is difficult to be made due to noise of in the environment. Additionally, when a commercial transaction service, a financial transaction service and the like are used through a video phone, information on the product can be transmitted through a chatting with a counselor so that a smooth commercial-transaction service can be provided. Furthermore, contents which a user is unwilling to expose to another person can be transmitted to a caller through a chatting during a video phone conversation so that a the service quality in terms of the privacy protection can be significantly improved.

BRIEF DESCRIPTION OF THE DRAWINGS

The above aspects and features of the present invention will be made more apparent by describing certain embodiments of the present invention with reference to the accompanying drawings, in which.

Figure 1:
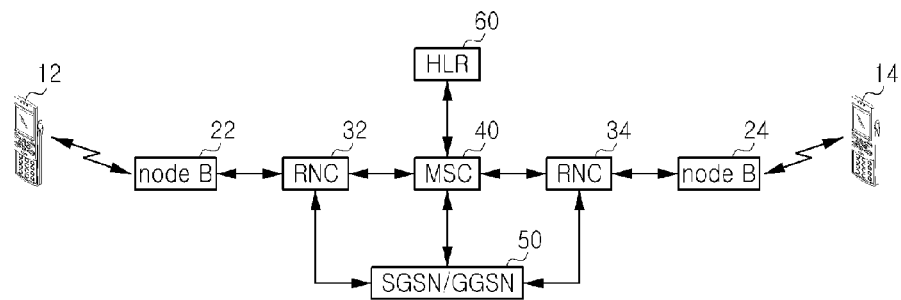
FIG. 1 is a block diagram of a mobile communication network according to the present invention.

EXPLANATION OF THE REFERENCE NUMERALS FOR THE MAIN PORTIONS IN THE DRAWINGS 12, 14: mobile communication terminal
22, 24: node B
32, 34: radio network controller
40: mobile switching center

MODE FOR THE INVENTION

A chatting service method interworking with a video phone service according to an embodiment of the present invention comprises steps of: (a) initiating a video phone call between mobile communication terminals, and the mobile communication system transmitting chatting service subscription confirmation messages to the mobile communication terminals participating in the video phone call; (b) if a chatting service request signal is input to at least one of the mobile communication terminals in a video phone call, confirming whether the mobile communication terminal is available for the chatting service interworking with a video phone service, and if the chatting service is available, the mobile communication terminal transmitting the chatting service request message through a mobile switching center (MSC) to a counterpart mobile communication terminal, confirming whether the counterpart mobile communication terminal is available for the chatting service, and transmitting the confirmation result to the mobile communication terminal having transmitted the chatting service request message; and (c) if the counterpart mobile communication terminal is available for the chatting service, transmitting a chatting service response message to the mobile communication terminal having transmitted the chatting service request message to initiate the chatting service interworking with a video phone service.

Exemplary embodiments of the present invention will be described in detail with reference to the annexed drawings. In the following description, a mobile communication terminal refers to one capable of video phone, and a mobile communication network refers to one that can provide a video phone service and has an audio/data concurrent service function.

FIG. 1 is a view of an example of a mobile communication network according to the present invention.

As illustrated in FIG. 1, the mobile communication network according to the present invention comprises mobile communication terminals 12, 14, nodes B 22, 24, radio network controllers (RNC) 32, 34, a mobile switching center (MSC) 40, a serving GPRS Support Node (SGSN)/Gateway GPRS Support Node (GGSN) 50, and a home location register (HLR) 60.

The mobile communication terminals 12, 14 have a removable or built-in camera and can send and receive a call for a video phone conversation. The nodes B 22, 24 make the wireless section communication between mobile communication terminals 12, 14 possible. The RNCs 32, 34 are connected to the plurality of nodes B 22, 24 to manage subscriber states, connect a mobile communication network with a packet service, and interwork with a data network. The MSC 40 is connected to the RNCs to perform call exchanges for providing a packet or circuit service to the mobile communication terminals 12, 14. The SGSN/GGSN 50 is connected to the mobile communication terminals 12, 14 for a packet data service and transmits call-sending and call-receiving packet data. The HLR 60 is connected to the MSC 40 to manage subscriber information, additional service, and subscriber location.

In such a mobile communication network, a call-sending mobile communication terminal 12 and a call-receiving mobile communication terminal 14 will be separately explained for convenience of explanation, and call-sending side mobile communication network constitutional elements 22, 32 and call-receiving side mobile communication network constitutional elements 24, 34 will also be separately explained.

The process of initiating a video phone conversation between the mobile communication terminals 12, 14 will be briefly explained as follows. As the call-sending mobile communication terminal tries to send a call for a video phone conversation, the MSC 40 transmits alerting signals to the call-receiving mobile communication terminal 14, and as the call-receiving mobile communication terminal 14 responds to the alerting signals, the MSC 40 transmits the alerting signals to the call-sending mobile communication terminal 12. After it is recognized that the connection between the call-sending and call-receiving mobile communication terminals 12, 14 is completed, a video phone conversation between the call-sending and call-receiving mobile communication terminals 12, 14 is initiated.

Additionally, during the process of initiating a video phone conversation, the MSC 40 transmits, using one of the messages transmitted to the mobile communication terminals 12, 14, a chatting service subscription confirmation message showing whether mobile communication terminals 12, 14 participatinged in the video phone conversation can use a the chatting service during a video phone conversation. To do this, users of the mobile communication terminals 12, 14 should in advance subscribe for to an additional service to use a the chatting service interworking with a video phone service.

After a video phone conversation is initiated, in order to use a chatting the chatting service, a the user of the mobile communication terminal 12 selects a certain key of the mobile communication terminal 12, and then the mobile communication terminal 12 checks the chatting service subscription confirmation message transmitted from the MSC 40 during the process of initiating a video phone conversation. As a result of the checking, if it is determined that a chatting the chatting service is available, the call-sending mobile communication terminal 12 requests through the MSC 40 the call-receiving communication terminal 14 to perform a chatting the chatting service interworking with a video phone service, and it confirms whether the call-receiving communication terminal 14 can provide a chatting the chatting service interworking with a video phone service so as to transmit a message showing whether a chatting the chatting service interworking with a video phone is available to the call-receiving mobile communication terminal 14. Then, if it is determined that the call-receiving mobile communication terminal 14 can also provide a chatting the chatting service during a video phone conversation, a chatting the chatting service together with a video phone conversation can be made.

The above description has explained, when a user requests for a chatting the chatting service, the method of confirming whether the user is a subscriber of a chatting the chatting service interworking with a video phone service by asking a call-receiving mobile communication terminal whether a chatting the chatting service interworking with a video phone service is available and receiving a response from the call-receiving mobile communication terminal. However, this should not be considered as limiting.

Meanwhile, a chatting the chatting service interworking with a video phone service can be made using a User Input Indication (UII) message defined in H.245 protocol used for line connections between terminals and channel assignments in a video phone service. In other words, after a video phone conversation is initiated, a chatting service request message and a message responding to this message can be transmitted and received through a UII message between the mobile communication terminals, and if a chatting the chatting service is activated, chatting contents between terminals can also be transmitted through a UII message.

Figure 2:
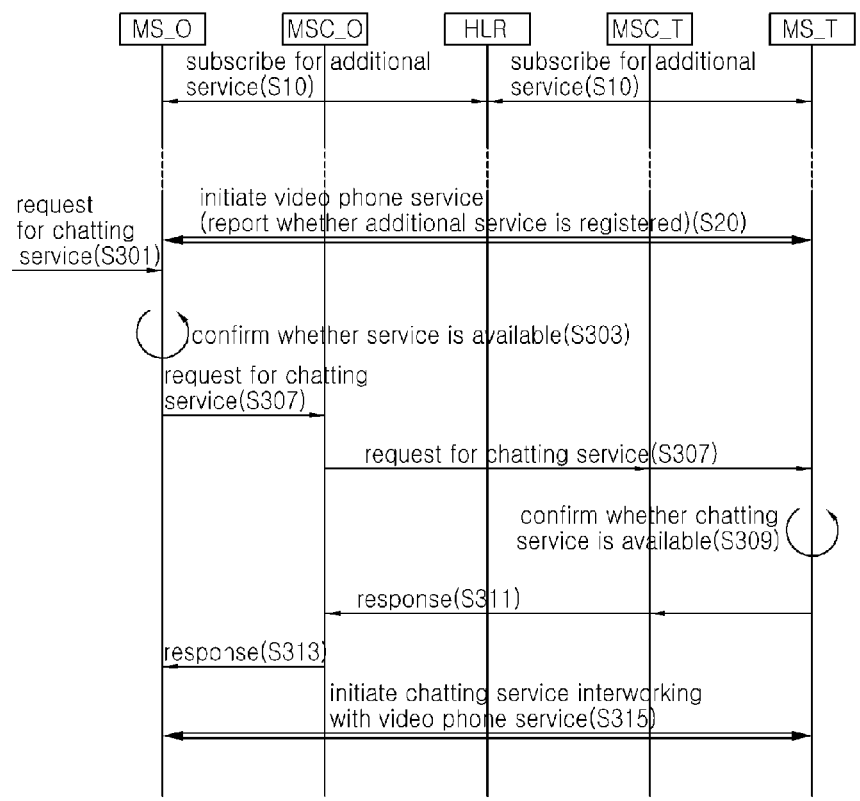
FIG. 2 is a flowchart for explaining a chatting service method interworking with a video phone service.

FIG. 2 is a flowchart for explaining a method for providing a chatting the chatting service interworking with a video phone service.

As illustrated in the drawing, it is preferable for the mobile communication terminal to perform a process of in advance registering in advance an additional service in order to use a chatting the chatting service interworking with a video phone service (S10).

After a chatting the chatting service interworking with a video phone service is registered, as a call-sending mobile communication terminal MS_O tries calling sending a call, a video phone service is initiated according to certain procedures. During this process, the MSCs MSC_O, MSC_T transmit chatting service subscription confirmation messages to each mobile communication terminal MS_O, MS_T (S20). At this time, the chatting service subscription confirmation message may use one of various messages such as an alerting message, a connection request message, and the like which are transmitted from the MSCs MSC_O, MSC_T to the mobile communication terminals MS_O, MS_T for initiating a video phone service, and the mobile communication terminals MS_O, MS_T store the received chatting service subscription confirmation message.

After a video phone service is initiated, if one of the mobile communication terminals on in the video phone conversation, for example the call-sending mobile communication terminal MS_O, selects a certain key to use a chatting the chatting service (S301), the call-sending mobile communication terminal MS_O confirms, based on the chatting service subscription confirmation message in advance received and stored in advance, whether a chatting the chatting service interworking with a video phone service can be used (S303). If it is determined that the chatting service is unavailable, the mobile communication terminal displays a message such as please use the chatting service after subscription or unavailable area for the chatting service.

However, if it is determined that the chatting service is available in step S303, the mobile communication terminal MS_O requests through the MSC MSC_O for the connection to a chatting the chatting service interworking with a video phone service (S305). Accordingly, the MSC MSC_O transmits the request for the connection to the chatting service interworking with a video phone service through the MSC MSC_T of the call-receiving side to the call-receiving mobile communication terminal MS_T (S307).

Then, the call-receiving mobile communication terminal MS_T confirms, based on the chatting service subscription confirmation message received and stored in advance received and stored at the time of initiating a video phone service, whether the chatting service interworking with a video phone service is available (S309), and it transmits a response message to the request for the chatting service interworking with a video phone service through the call-receiving MSC MSC_T to the call-sending MSC MSC_O (S311).

The call-sending MSC MSC_O transmits a response message to the request for the chatting service interworking with a video phone service to the call-sending mobile communication terminal MS_O (S313).

If it is determined that the call-receiving mobile communication terminal MS_T is available for the chatting service interworking with a video phone service when the call-sending mobile communication terminal MS_O confirms the received response message in step S313, a chatting the chatting service interworking with a video phone service is initiated between the call-sending and call receiving mobile communication terminals MS_O and MS_T (S315).

The mobile communication terminals MS_O, MS_T can transmit and receive a chatting service request message and a response message thereto through a UII message, and to do this, an object ID OID of the UII message may include, for example, an object field and a data field. The object field may include, for example, information on types of messages, and the data field may record data which are is actually transmitted.

According to an embodiment of the present invention, the chatting service request message and the object ID of the response message thereto may be configured, for example, as [Table 1].

TABLE 1

| USE | OID | |
|---|---|---|
| | OBJECT | DATA |
| 3G-324M chatting service request | 114 | 324M VTC |
| 3G-324M chatting service request | 115 | 324M VTC Ack |

If the chatting service acceptance message OID115 324M_VTC_Ack is not transmitted from the call-receiving mobile communication terminal MS_T within a designated time period, for example 4 seconds, after the call-sending mobile communication terminal MS_O transmits the chatting service request message OID114 324M_VTC, the mobile communication terminal displays a message such as terminal unavailable for service. However, if the chatting service acceptance message is transmitted within a designated time period, step S315 is performed so that a chatting the chatting service interworking with a video phone service can be made.

After a chatting the chatting service interworking with a video phone is initiated, the chatting contents transmitted and received between the mobile communication terminals MS_O, MS_T can use a UII message, and for this, the object ID of the UII message may include, for example, an object field and a data field. The example is shown as [Table 2].

TABLE 2

| USE | OID | |
|---|---|---|
| | object | Data |
| VTC message transmission | 13 | Encoded character |

The data field is divided into, for example, a data coding scheme (DCS) field, a user data length (UDL) field, and a user data (UD) field. The DSC field defines a coding scheme of data, the UDL field defines a the size of transmitted data, and the UD field records the actual chatting message. The data coding scheme may be a completion type Korean standard code (KSC) 5601 code in the case of Korean, an American standard code for information interchange-8 (ACSII8) code or an American standard code for information interchange-7 (ACSII7) code in the case of English, or an ASCII8 code or an ASCII7 code in the case of numerals or a the combination of numerals and English, or a user may set and transmit a global system for mobile communications-7 (GSM7) code or a universal character set 2 (USC2) code. The KSC-5601 code is means a Korean completion type standard code. The ASCII7 code is American standard code for information exchange which uses 7-digit binary numerals, and the ASCII8 code is means the code system using 8 bits for every letter by expanding the 8-bit ASCII7 code. Additionally, GSM7 is a standard code used in a GSM communication scheme.

Figure 3:
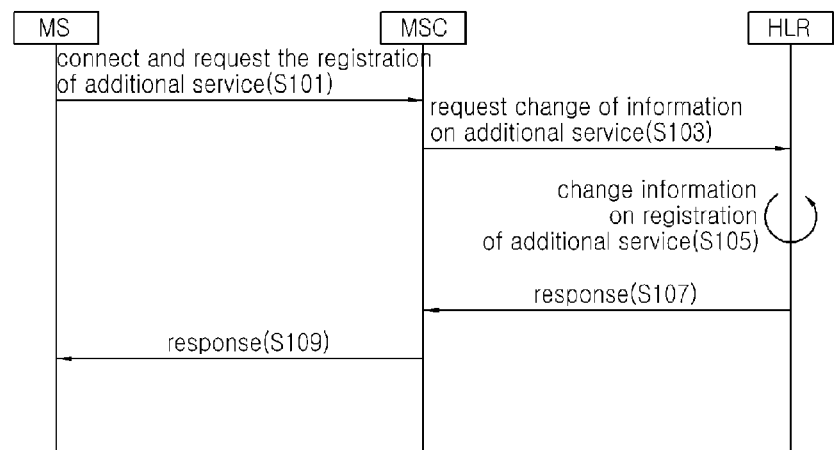
FIG. 3 is a detailed flowchart of a process of subscribing for to an additional service, as illustrated in FIG. 2.

FIG. 3 is a detailed flowchart of a process of subscribing for an additional service, illustrated in FIG. 2.

*In order to use a chatting the chatting service interworking a video phone service, a mobile communication terminal user should in advance register in advance an additional service for the chatting service, and this process is shown in FIG. 3

As illustrated in FIG. 3, if the mobile communication terminal MS is connected to the MSC to request for an additional service, i.e. a chatting the chatting service interworking a video phone service (S101), the MSC transmits to the HLR the numerals of the mobile communication terminal and information on the additional service to be changed in order to request for registration of an additional service (S103).

Accordingly, the HLR changes the additional service subscription information of the subscriber (S105) and transmits the change result of the information on the additional service to the MSC (S107). Then, the MSC transmits the additional service registration result to the mobile communication terminal MS (S109) so that the registration of the chatting service interworking with a video phone service is completed.

Furthermore, besides the above process of directly registering the additional service through the mobile communication terminal MS, the additional service may be registered by the process in which the additional service subscription information is transmitted to the HLR, and the HLR performs the change of the service based on the received additional service subscription information, wherein the additional service subscription information is formed by executing the mutual communication between the subscriber of the mobile communication terminal MS and the customer center of the mobile communication provider.

Figure 4:
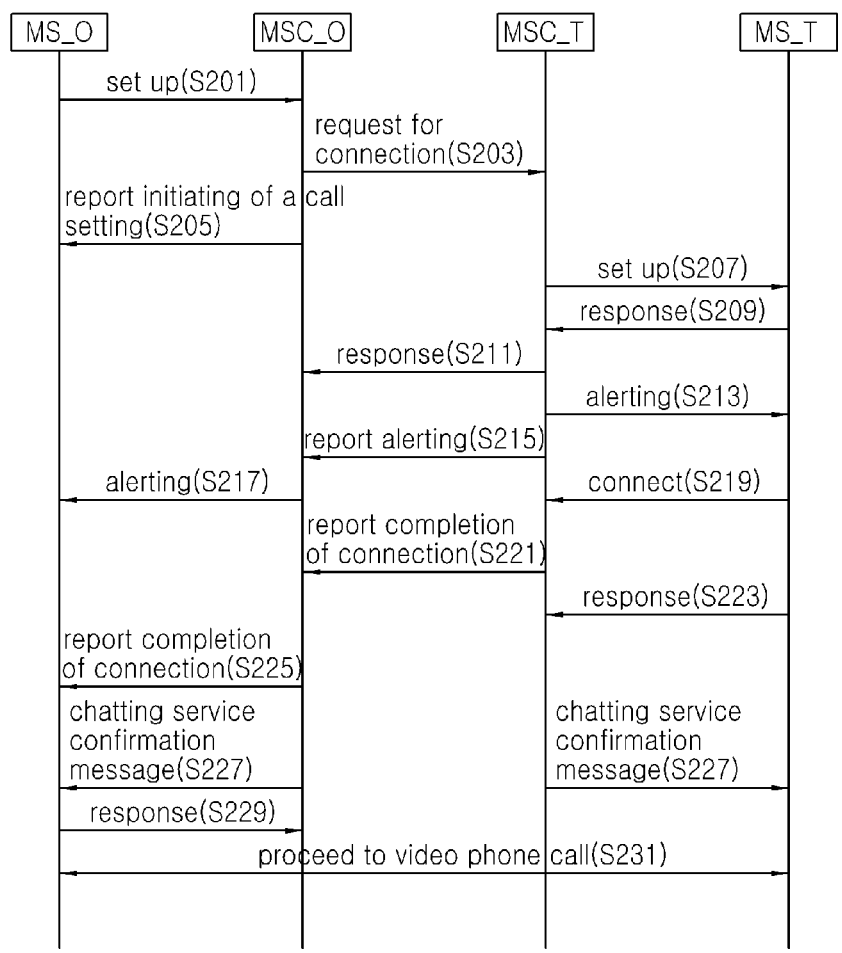
FIG. 4 is a detailed flowchart of a process of initiating a video phone service, as illustrated in FIG. 2.

FIG. 4 is a detailed flowchart of a process of initiating a video phone service, illustrated in FIG. 2.

If the call-sending mobile communication terminal MS_O transmits a set-up message SETUP to use a video phone service (S201), the set-up message SETUP is transmitted to the call-sending MSC MSC_O, and the call-sending MSC MSC_O reports the reception receipt of the set-up message SETUP to the call-receiving MSC MSC_T (S203) and reports the initiation of call setting to the call-sending mobile communication terminal MS_O (S205). The call-sending MSC MSC_O may transmit a message to the call-receiving MSC MSC_T using an ISUP IAM message, and the ISUP IAM message is to initiate the possession of an outgoing line and to transmit numerals necessary for a call process and a path setting, and other information.

Then, the call-receiving MSC MSC_T transmits the set-up message SETUP to the call-receiving mobile communication terminal MS_T (S207) to report the request of a video phone service, and if the call-receiving mobile communication terminal MS_T responds to the message (CALL CONFIRMED) (S209), the call-receiving MSC MSC_T reports to the call-sending MSC MSC_O that all address information necessary for a call-setting up to the call-receiving side is received (S211).

After the call-receiving MSC MSC_T transmits alerting signals to the call-receiving mobile communication terminal MS_T (S213), it reports the transmission of the alerting signals to the call-sending MSC MSC_O (ISUP CPG) (S215), and the call-sending MSC MSC_O transmits the alerting signals to the call-sending mobile communication terminal MS_O (S217). Here, the ISUP CPG message is to report the events generated during a call setting to the call-sending side.

If the call-receiving mobile communication terminal MS_T responds to the alerting signals (S219), the call-receiving MSC MSC_T reports to the call-sending MSC MSC_O that the call-receiving mobile communication terminal MS_T has responded (ISUP ANM) (S221) and transmits to the call-receiving mobile communication terminal MS_T a response message to the connection (S223), and the call-sending MSC MSC_O reports to the call-sending mobile communication terminal MSC_O that the connection has been completed (S225).

Thereafter, the call-sending MSC MSC_O transmits the chatting service subscription confirmation message to the call-sending mobile communication terminal MS_O, and the call-receiving MSC MSC_T transmits the chatting service subscription confirmation message to the call-receiving mobile communication terminal MS_T (S227). Accordingly, each mobile communication terminal stores the chatting service subscription confirmation message received from the MSCs. The chatting service subscription confirmation message should not be considered as being limitedly to being transmitted only in step S227. The chatting service subscription confirmation message may be transmitted before step S225, using one of the messages which the MSCs transmit to the mobile communication terminals.

Then, as when the call-sending mobile communication terminal MS_O has responded (S227), a video phone service between the call-sending mobile communication terminal MS_O and the call-receiving mobile communication terminal Ms_T is initiated (S229). Here, the ISUP ANM message is for the call-receiving side to report the response to a call.

FIG. 4 shows an example of a process of initiating a video phone service, but the chatting service interworking with a video phone service according to the present invention should not be considered as being limitedly to being applied to the case where a video phone service is initiated as illustrated in FIG. 4.

Figure 5:
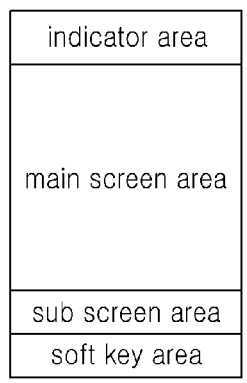
FIG. 5 is a view illustrating a screen constitution of a mobile communication terminal according to the present invention.

FIG. 5 is a view illustrating a screen constitution of a mobile communication terminal according to the present invention.

When a video phone is used, a the screen of a mobile communication terminal is divided into an indicator area, a main screen area, a sub screen area, and a soft key area as illustrated in FIG. 5. The indicator area displays an indicator showing reception intensity, and a the battery charging state, and the main screen area displays an image provided by the counterpart user of a the video phone service. The sub screen area displays information related to a the video phone service such as time using a the video phone service, and the soft key area displays a menu key, a substitution image selection key, and a volume adjustment key.

Additionally, in order to make the chatting service possible during a video phone conversation, the soft key area further comprises a chatting service activation key so that if a user wishes to use the chatting service, a user can utilize the sub screen area as a chatting window and perform chatting with the counterpart user, simultaneously with conducting a conversation on the phone while seeing an image displayed through the main screen area.

In the present embodiment, the chatting service activation key is included in the soft key area, but it should not be considered as limiting.

Furthermore, in the present embodiment, the chatting service is made with the counterpart user of the video phone, but it should not be considered as limiting. A user in a video phone service may directly input the telephone numerals of another person with whom the video phone user wishes to chat so that the video phone user can use the chatting service with a third party, while making conducting a conversation with the counterpart user of the video phone by a video phone.

While the invention has been shown and described with reference to certain embodiments thereof, it will be understood by those skilled in the art that various changes in form and details may be made thereto without departing from the spirit and scope of the invention as defined by the appended claims.

INDUSTRIAL APPLICABILITY

The present invention implements a chatting the chatting service interworking with a video phone service which can transmit and receive a text during a video phone conversation without terminating the video phone conversation, and furthermore, it improves service quality of a video phone by transmitting and receiving a text during a video phone conversation if a video phone conversation is made in poor an unsuitable environment. Accordingly, the systems and terminal devices relevant to the present invention can sufficiently come into the market or be in business and they can be obviously easily carried out, so that the present invention has industrial applicability.

The invention claimed is:

1. A chatting service method interworking with a video phone service in a mobile communication system capable of using a video phone service, the method comprising the steps of:

initiating a video phone call between a first mobile communication terminal and a second mobile communication terminal;

transmitting, by a mobile switching center (MSC), chatting service subscription confirmation messages to the first mobile communication terminal and the second mobile communication terminal, which are participating in the video phone call;

if a chatting service request signal is input to the first mobile communication terminal, confirming whether the first mobile communication terminal is available for a chatting service interworking with a video phone service by checking the chatting service subscription confirmation message transmitted from the MSC;

if the chatting service is available, transmitting, by the first mobile communication terminal, a chatting service request message through the MSC to the second a mobile communication terminal;

confirming whether the second mobile communication terminal is available for the chatting service by checking the chatting service subscription confirmation message transmitted from the MSC;

transmitting the confirmation result to the first mobile communication terminal; and if the second mobile communication terminal is available for the chatting service, transmitting, by the second mobile communication terminal, a chatting service response message through the MSC to the first mobile communication terminal to initiate the chatting service interworking with the video phone service.

2. The method according to claim 1, further comprising the step of:
registering the chatting service interworking with the video phone service for the first mobile communication terminal as an additional service, prior to the step of initiating the video phone call.

3. The method according to claim 2, wherein the step of registering the additional service comprises the steps of:
if the first mobile communication terminal requests the MSC to register the chatting service interworking with the video phone service, transmitting, by the MSC, a numeral of the requesting mobile communication terminal and information on the additional service to be changed to a home location register (HLR) to request for registration of the additional service;
changing, by the HLR, the information on the additional service of a subscriber corresponding to the numeral of the requested mobile communication terminal;
transmitting, by the HLR, the change result of the additional service information to the MSC; and
transmitting, by the MSC, the registration result of the additional service to the requesting mobile communication terminal.

4. The method according to claim 3, wherein the step of registering the additional service further comprises:
receiving, by the HLR, additional service subscription information to perform the change, wherein the additional service subscription information is formed by mutual communication between the subscriber of the requesting mobile communication terminal and a customer center of a mobile communication provider.

5. The method according to claim 1, wherein the chatting service request message is transmitted as part of an H.245 User Input Indication message.

6. The method according to claim 5, wherein the chatting service request message comprises an object field and a data field, or further comprises an additional field.

7. The method according to claim 6, wherein the object field comprises information on types of messages, and the data field records data which is actually transmitted.

8. The method according to claim 1, wherein the step of confirming whether the second mobile communication terminal is available for the chatting service comprises the steps of:
confirming, by the second mobile communication terminal, the chatting service subscription confirmation message received from the MSC, and transmitting the chatting service request message corresponding to the received chatting service subscription confirmation message.

9. The method according to claim 1, wherein the chatting service response message is transmitted as part of an H.245 User Input Indication message.

10. The method according to claim 9, wherein the chatting service response message comprises an object field and a data field, or further comprises an additional field.

11. The method according to claim 10, wherein the object field comprises information on types of messages, and the data field records data which is actually transmitted.

12. The method according to claim 1, further comprising the steps of:
transmitting chatting contents through an H.245 User Input Indication message between the mobile communication terminals; and
receiving the chatting contents through the H.245 User Input Indication message between the mobile communication terminals.

13. The method according to claim 12, wherein the User Input Indication message, through which the chatting contents are transmitted and received, comprises an object field and a data field.

14. The method according to claim 13, wherein the data field comprises a data coding scheme (DCS) field defining a data coding scheme, a user data length (UDL) field defining a the size of transmitted data, and a user data (UD) field recording the chatting contents.

15. The method according to claim 14, wherein the data coding scheme is one of Korean standard code (KSC) 5601 code, an American standard code for information interchange-8 (ACSII8) code, an American standard code for information interchange-7 (ACSII7) code, a global system for mobile communications-7 (GSM7) code, and a universal character set 2 (USC2) code.

* * * * *